United States Patent [19]

Numao

[11] Patent Number: 5,103,328
[45] Date of Patent: Apr. 7, 1992

[54] LIQUID CRYSTAL DISPLAY DEVICE HAVING LIGHT SHUTTER ELEMENTS DISPOSED BETWEEN THE BACKLIGHT SOURCE AND THE DISPLAY PANEL

[75] Inventor: Takaji Numao, Nara, Japan

[73] Assignee: Sharp Kabushiki Kaisha, Osaka, Japan

[21] Appl. No.: 730,527

[22] Filed: Jul. 15, 1991

Related U.S. Application Data

[63] Continuation of Ser. No. 304,198, Jan. 31, 1989, abandoned.

[30] Foreign Application Priority Data

Feb. 4, 1988 [JP] Japan .................. 63-24502

[51] Int. Cl.$^5$ .................. G02F 1/133; G09G 3/36
[52] U.S. Cl. .................. 359/53; 359/56; 359/48; 340/784
[58] Field of Search .................. 350/335, 345, 350 S, 350/333; 340/784

[56] References Cited

U.S. PATENT DOCUMENTS

| | | | |
|---|---|---|---|
| 4,591,886 | 5/1986 | Umedo et al. | 350/350 S |
| 4,634,226 | 1/1987 | Isogai et al. | 350/350 S X |
| 4,778,260 | 10/1988 | Okada et al. | 350/333 |
| 4,843,381 | 6/1989 | Baron | 340/784 |
| 4,904,064 | 2/1990 | Lagerwall et al. | 350/350 S |
| 4,909,607 | 3/1990 | Ross | 350/333 |
| 4,924,215 | 5/1990 | Nelson | 350/350 S |
| 4,958,915 | 9/1990 | Okada et al. | 350/345 |

FOREIGN PATENT DOCUMENTS

233563 1/1985 Japan .

Primary Examiner—Stanley D. Miller
Assistant Examiner—Tai V. Duong

[57] ABSTRACT

A liquid crystal display device includes a liquid crystal display panel for displaying picture elements in accordance with a predetermined voltage applied thereto. In the liquid crystal display device, a light shutter is arranged between the liquid crystal display panel and a light source, and the light shutter shades the light incident to the picture elements being rewritten from the light source.

13 Claims, 7 Drawing Sheets

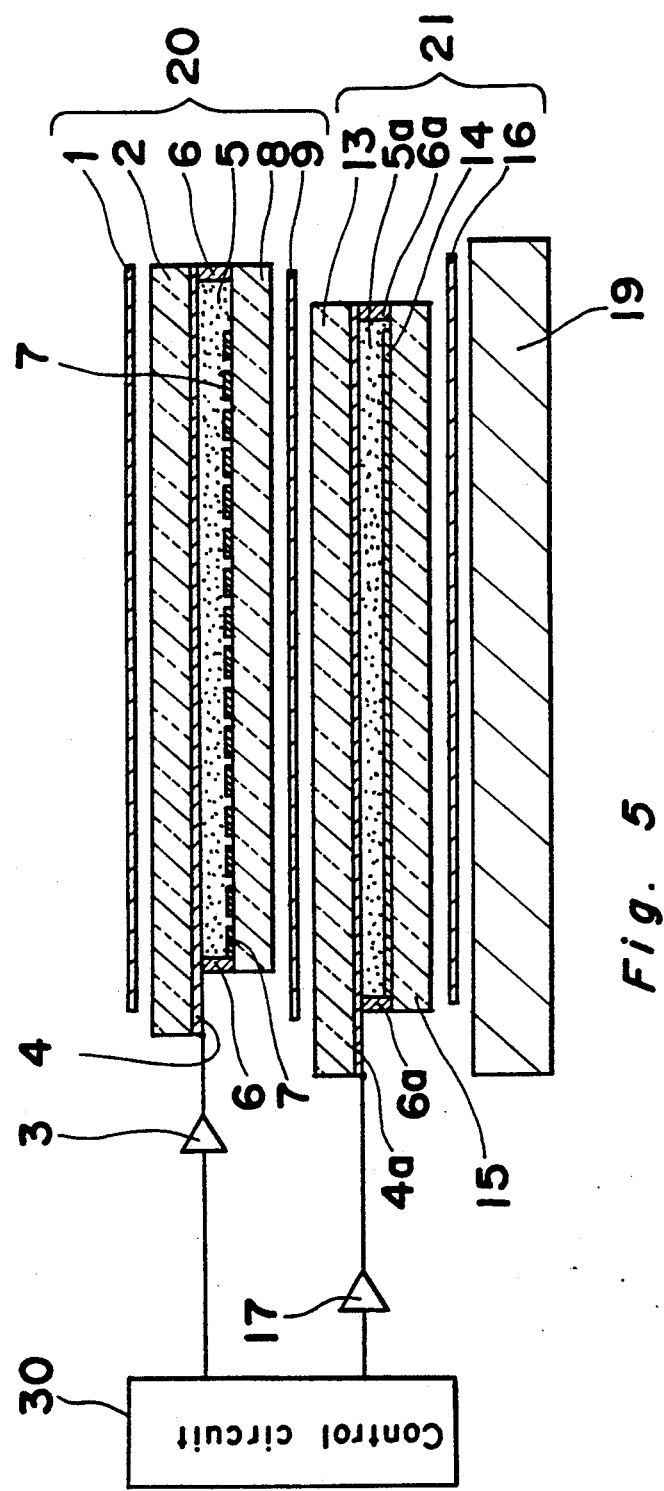
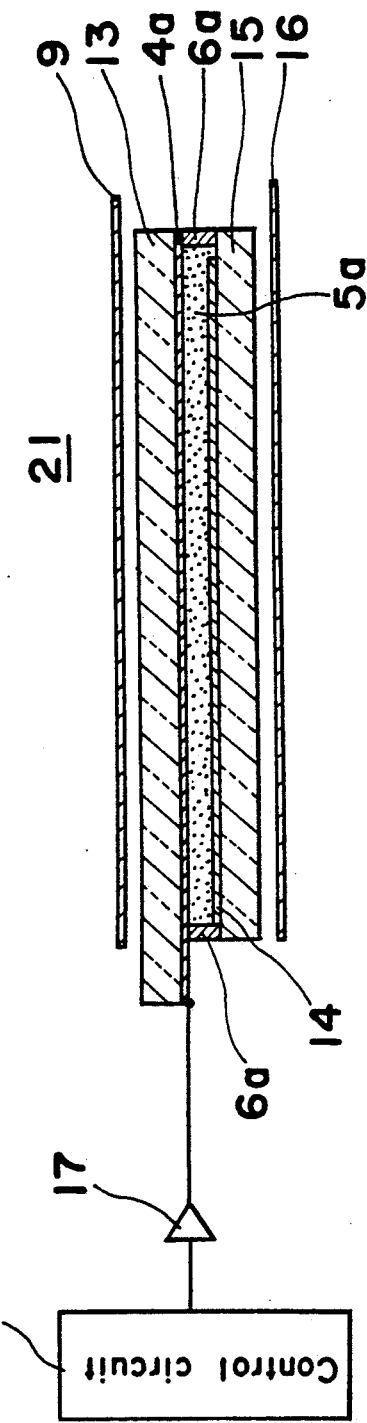

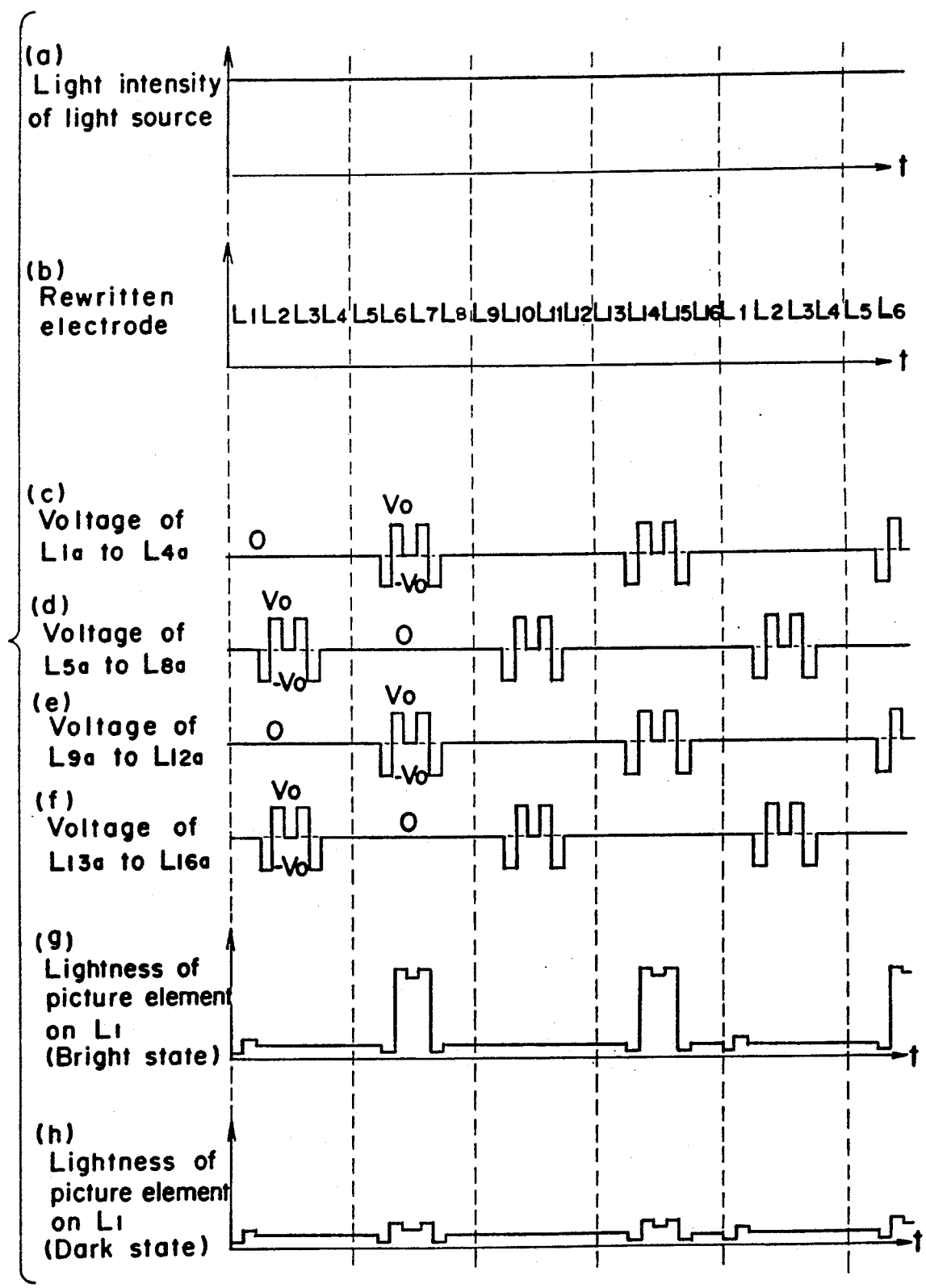

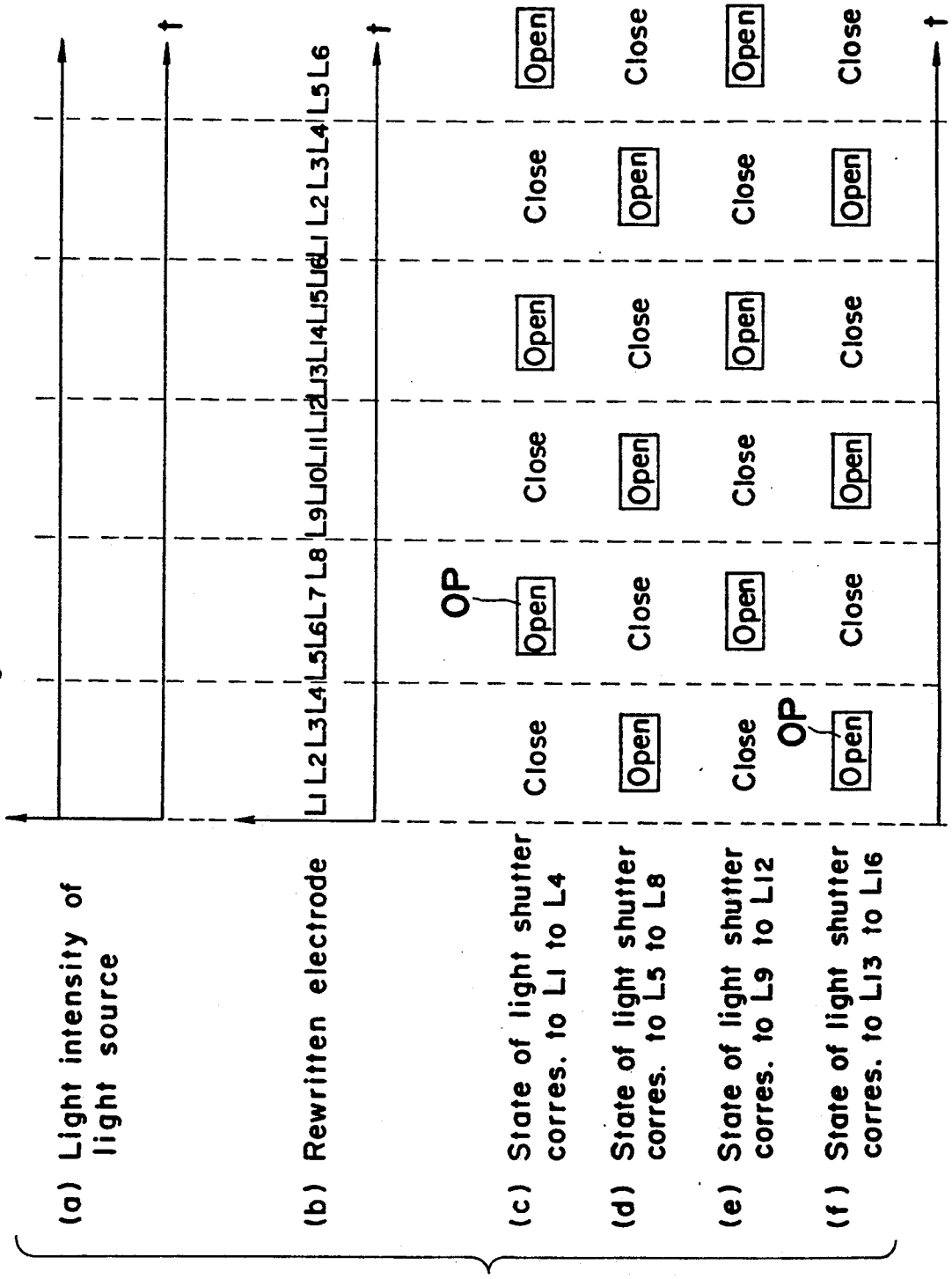

(a) Light intensity of light source
(b) Rewritten electrode

LIQUID CRYSTAL DISPLAY DEVICE HAVING LIGHT SHUTTER ELEMENTS DISPOSED BETWEEN THE BACKLIGHT SOURCE AND THE DISPLAY PANEL

This application is a continuation of application Ser. No. 07/304,198 filed on Jan. 31, 1989, now abandoned.

BACKGROUND OF THE INVENTION

1. Field of the Invention

The present invention relates to a liquid crystal display device, and more particularly, to a light transmissive type ferroelectric liquid crystal display device having a matrix type display panel.

2. Description of Prior Art

FIGS. 7 and 8 show fundamental structures of a conventional matrix type display with the use of a light transmissive type ferroelectric liquid crystal display.

In FIGS. 7 and 8, polarizers 1 and 9 arranged to have crossed Nicols relation, are formed oppositely to each other, and a light source (not shown) is location on the outer surface of the polarizer 9. Transparent substrates 2 and 8, made of glass, are arranged on the inner surfaces of the polarizers 1 and 9, respectively. Sixteen transparent conductive scanning electrodes 4 ($L_1$ to $L_{16}$) having a strip shape are formed in parallel with each other on the inner surface of the transparent substrate 2, and sixteen transparent conductive signal electrodes 7 for applying a signal having a strip shape are formed in parallel with each other on the inner surface of the transparent substrate 8. A ferroelectric liquid crystal layer 5 is formed between the transparent substrates 2 and 8 and is sealed by a sealing element 6. Respective drivers 3 are connected to the respective scanning electrodes 4 ($L_1$ to $L_{16}$) so as to apply a voltage Vc thereto. Respective drivers 10 are connected to the respective signal electrodes 7 so as to apply a voltage Vs thereto.

The operation of the conventional matrix type display panel will be described below.

The portions where the respective electrodes 4 and electrodes 7 are overlapped become picture elements, respectively. In order to bring one of the picture elements into a bright state, it is necessary to apply the voltages Vc and Vs to the corresponding electrodes 4 and 7 so as to satisfy the following equation (1) (or (2)) for $\tau_0$ seconds or more.

$$Vc - Vs \geq Vth_1 \tag{1}$$

$$Vc - Vs \geq -Vth_2 \tag{2}$$

wherein $Vth_1$ and $Vth_2$ are threshold voltages of the liquid crystal and $\tau_0$ is a real number larger than zero.

On the other hand, in order to bring one of the picture elements into a dark state, it is necessary to keep another equation (2) (or (1)) for $\tau_0$ seconds or more. Normally, when a direct current voltage is applied to the ferroelectric liquid crystal layer 5, the characteristics of the equations (1) and (2) tend to be shifted. In order to avoid this, before applying a positive voltage $V_0$ (volts)=$Vc-Vs$ ($V_0 \geq Vth_1$) to the liquid crystal layer 5 for $\tau_0$ seconds, a negative voltage $-V_0$ (volts)=$Vc-Vs$ ($-V_0 \leq -Vth_2$) must be applied thereto for $\tau_0$ seconds. On the other hand, before applying the negative voltage $-V_0$ (volts)=$Vc -Vs$ to the liquid crystal layer 5 for $\tau_0$ seconds, the positive voltage $V_0=Vc-Vs$ must be applied thereto for $\tau_0$ seconds.

That is, it takes at least $2\tau_0$ seconds to rewrite the picture elements defined on one scanning electrode 4. The aforementioned switching operation between the positive and negative voltages is referred as to the selection of the scanning electrode 4 hereinafter, and the time interval necessary for the aforementioned switching operation is referred to the time interval for selecting the scanning electrode 4. It is to be noted that the voltages $Vth_1$, $-Vth_2$ and $\tau_0$ are determin the ferroelectric liquid crystal to be used.

In the case that images are displayed on the matrix type display panel shown in FIG. 7, on the assumption that the time for selecting one electrode 4 is $2\tau_0$, it takes selecting the sixteen scanning electrodes $L_1$ to $L_{16}$ sequentially. A time period needed for selecting all of the sixteen scanning electrodes $L_1$ to $L_{16}$ sequentially is referred to the frame period $T_F$ hereinafter.

In the case of the matrix type display panel shown in FIG. 7, there are the sixteen scanning electrodes 4; However, in the case that there are M scanning electrodes 4 in a matrix type display panel, the frame period $T_F$ is expressed as follows:

$$R_f M \times 2\tau_0 \tag{3}$$

wherein M is a positive integer.

When a ferroelectric liquid crystal having the time interval $\tau_0=100$ micro seconds is used and the number M of the scanning electrodes 4 is 400, the frame period $T_F$ is 0.08 seconds.

In order to hold one of picture elements in a dark state, it is necessary to apply the negative voltage thereto. However, when the scanning electrode 4 corresponding thereto is selected again after the frame period $T_F$, it becomes necessary to apply the positive voltage thereto for the time interval $\tau_0$. Due to this, the picture element is brought into a bright state temporarily. Namely, the picture element becomes the bright state every frame period $T_F$ (=0.08 seconds).

Thus, when the bright and dark states of the picture element are switched in a period larger than 1/60 seconds, a flicker is caused on the display panel affecting a human's eyes resulting in the display panel producing unsightly images.

In order to overcome the aforementioned disadvantages, a matrix type ferroelectric liquid crystal display device further comprising a back light source 11 as shown in FIG. 9 in addition to the structure shown in FIG. 8 is proposed. The back light source 11 is arranged on the outer surface of the polarizer 9, and the light intensity thereof is controlled by a control circuit 12 periodically as shown in (a) of FIG. 10. While the light intensity of the back light source 11 is kept relatively low, the control circuit 12 controls the drivers 3 and 10 so as to select individual scanning electrodes 4 sequentially.

In the aforementioned conventional display device comprising the back light source 11 and the control circuit 12, when at least one picture element is rewritten, the back light source 11 is turned off so that the whole matrix display panel becomes relatively dark. On the other hand, except for the respective time intervals for rewriting the picture elements, the back light source 11 is turned on.

The aforementioned conventional display device shown in FIG. 9 can prevent the display from flickering. However, since the scanning electrode 4 cannot be selected for the time interval when the light intensity of the back light source 11 is kept relatively high, the frame period $T_F$ increases. If the ratio of the time interval for the high light intensity to the time interval for the low light intensity of the back light source 11 is 1:1, the frame period $T_F$ becomes twice as long as that in the aforementioned display device not having the back light source. In the case that the time interval $\tau_0$ is 100 micro seconds and the number M of the scanning electrodes 4 is 400 as described above, the frame period $T_F$ becomes 0.16 seconds, resulting in that the movement of the images becomes slow in a moving image display.

SUMMARY OF THE INVENTION

An essential object of the present invention is to provide a liquid crystal display device which is able to prevent the display from flicking in a relatively short frame period TF.

According to the present invention, a liquid crystal display device is provided which:

includes first and second transparent substrate arranged in parallel to each other with a predetermined interval;

Further, a plurality of transparent scanning electrodes are formed on the inner surface of the first transparent substrate, and a plurality of transparent signal electrodes are formed on the inner surface of the second transparent substrate so as to cross the transparent scanning electrodes.

A liquid crystal layer is included for displaying picture elements defined at the crossings between the transparent scanning electrodes and the transparent signal electrodes in accordance with a predetermined voltage applied thereto. The liquid crystal layer is arranged between the first transparent substrate and said second transparent substrate.

Further, a light source is inclucded for emitting a light toward the liquid crystal layer. Finally a light shutter device is arranged between the liquid crystal layer and the light source for shading the light incident to the picture elements being rewritten from the light source.

Accordingly, since the light from the light source is not incident to the picture elements being rewritten, flicker is not caused on the display device. Furthermore, since the picture elements, except for the picture elements being rewritten are displayed, the frame period $T_F$ does not increase. The resulting in the quality of images displayed on the liquid crystal display device being improved.

BRIEF DESCRIPTION OF THE DRAWINGS

These and other objects and features of the present invention will become clear from the following description taken in conjunction with the preferred embodiments thereof with reference to the accompanying drawings, in which:

FIG. 2 is a schematic longitudinal cross-sectional view showing the liquid crystal display device shown in FIG. 1;

FIG. 3 is a timing chart showing the operation of the liquid crystal display device shown in FIGS. 1 and 2;

FIG. 5 is a schematic longitudinal cross-sectional view showing the light shutter panel shown in FIG. 4;

FIG. 6 is a timing chart showing the operation of the light shutter panel shown in FIGS. 4 and 5;

DETAILED DESCRIPTION OF THE PREFERRED EMBODIMENT

The preferred embodiment according to the present invention will be described below in detail, referring to the attached drawings.

Figure 1:
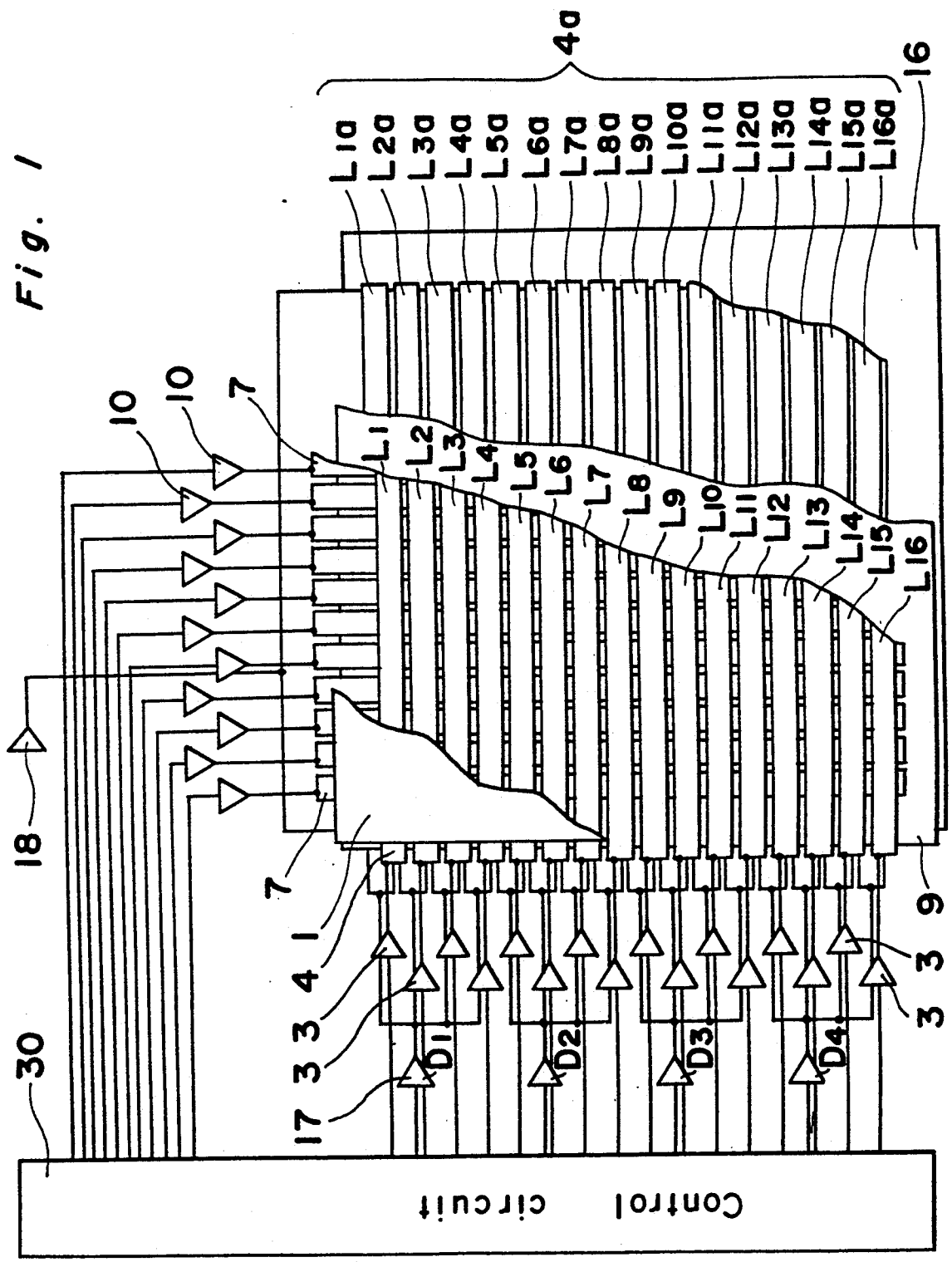
FIG. 1 is a schematic top plan view showing a liquid crystal display device of the preferred embodiment according to the present invention.

FIGS. 1 and 2 show fundamental structures of a two dimensional matrix type liquid crystal display device of the preferred embodiment, according to the present invention.

Figure 9:
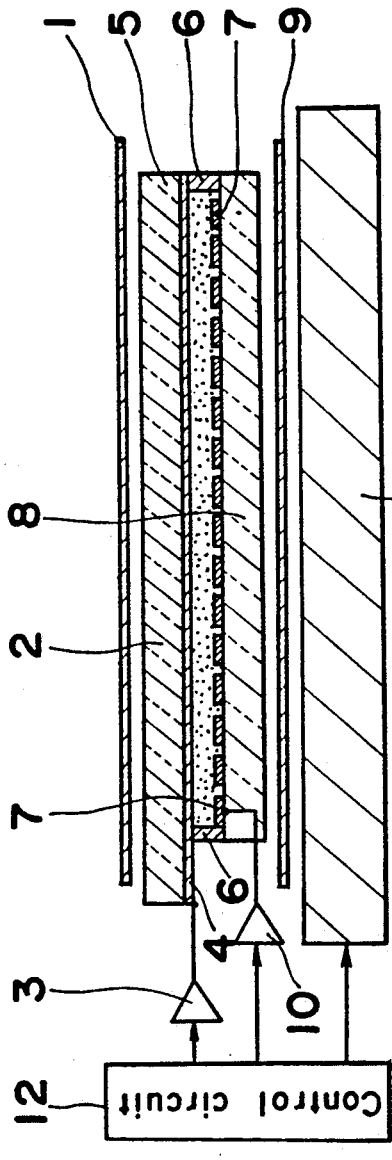
FIG. 9 is a schematic longitudinal cross-sectional view showing a further conventional liquid crystal display device.
Figure 10:
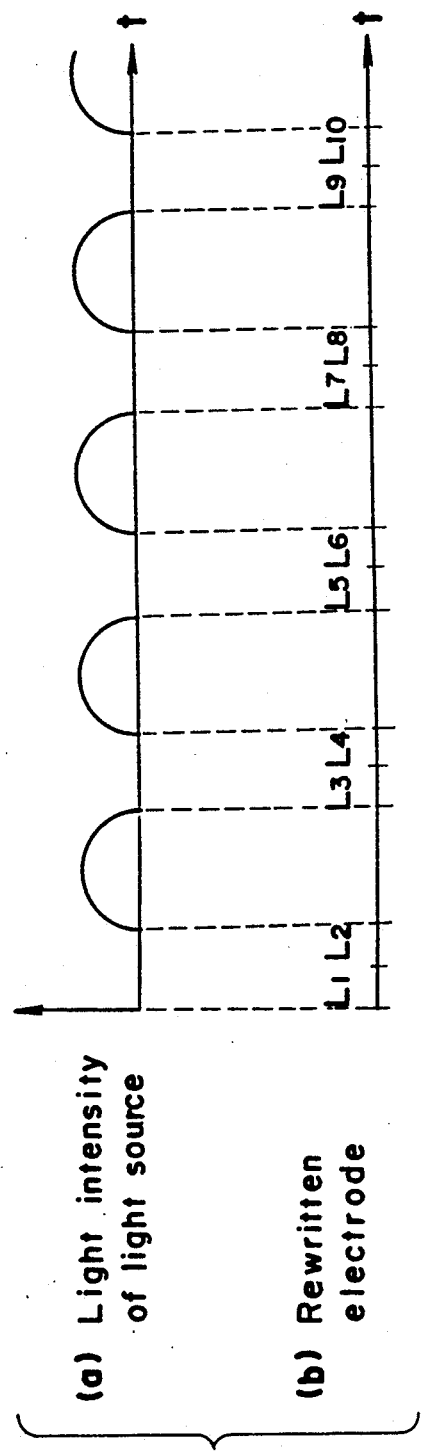
FIG. 10 is a timing chart showing the operation of the liquid crystal display device shown in FIG. 9.

As is apparent from comparison of FIG. 2 with FIG. 9, a light shutter panel 21 is inserted between a matrix display panel 20 and a light source 19. The structures of the light shutter panel 21 and the light source 19 are substantially same as those shown in FIG. 9.

The light shutter panel 21 is comprised of a liquid crystal cell having a structure of two transparent substrates 13 and 15, made of glass, sandwiching a ferroelectric liquid crystal layer 5a, contained therebetween in a sealed state by a sealing member 6a. Between the light shutter panel 21 and the light source 19, a polarizer 16 is inserted so as to satisfy a crossed Nicols relation with the polarizer 9 of the matrix display panel 20.

Figure 4:
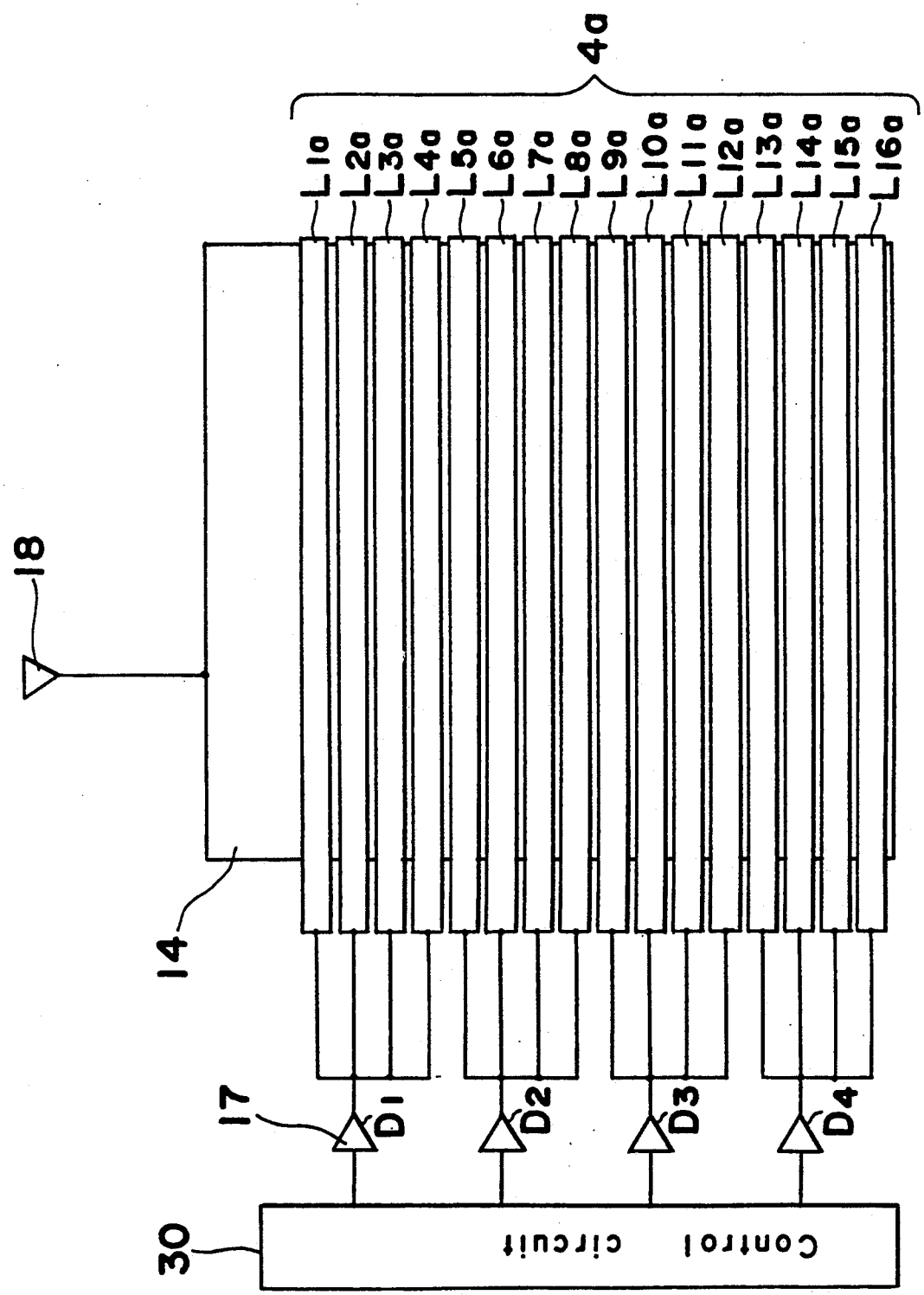
FIG. 4 is a schematic top plan view showing a light shutter panel used in the liquid crystal display device shown in FIGS. 1 and 2.
Figure 7:
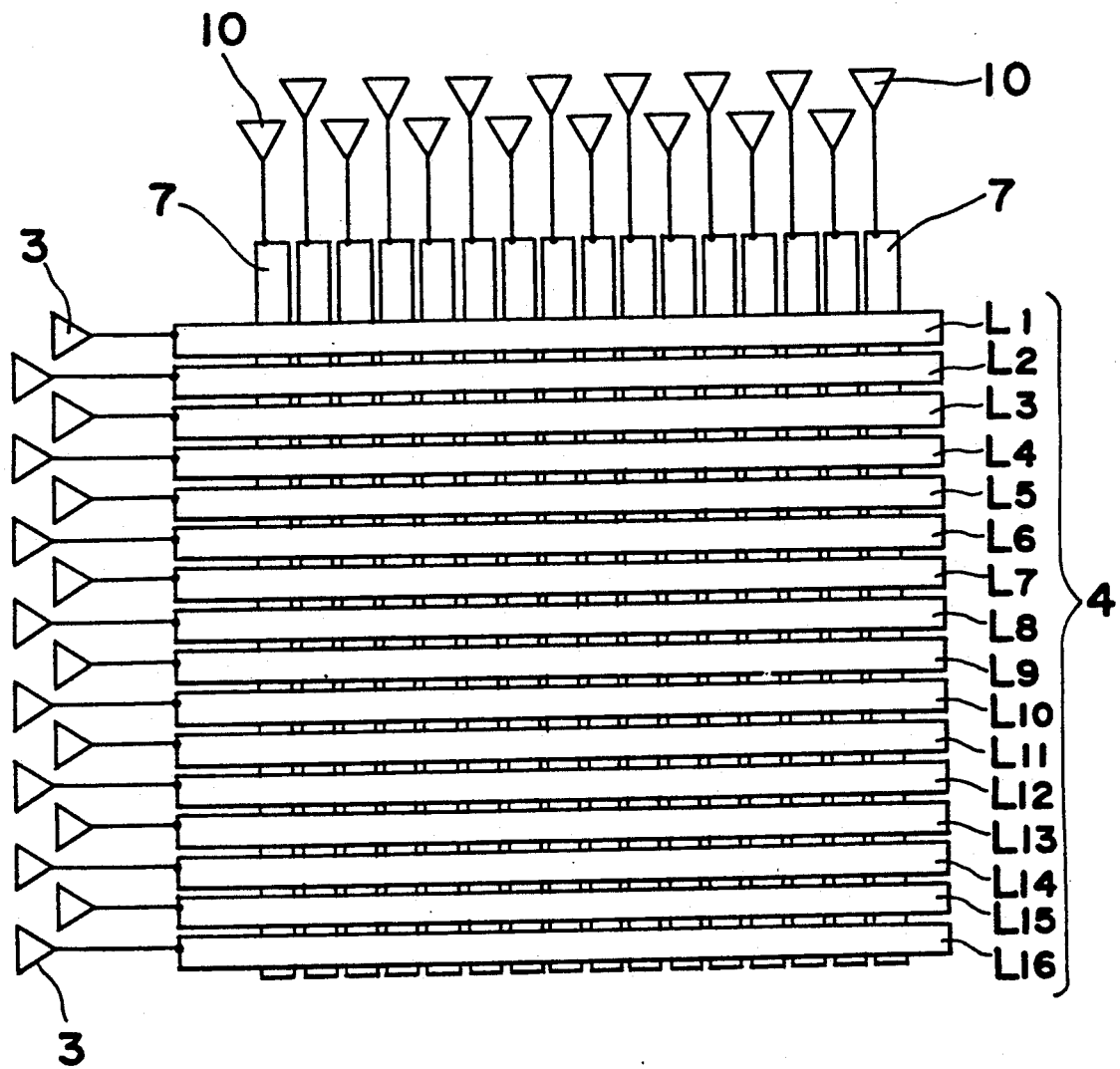
FIG. 7 is a schematic top plan view showing a conventional liquid crystal display device.
Figure 8:
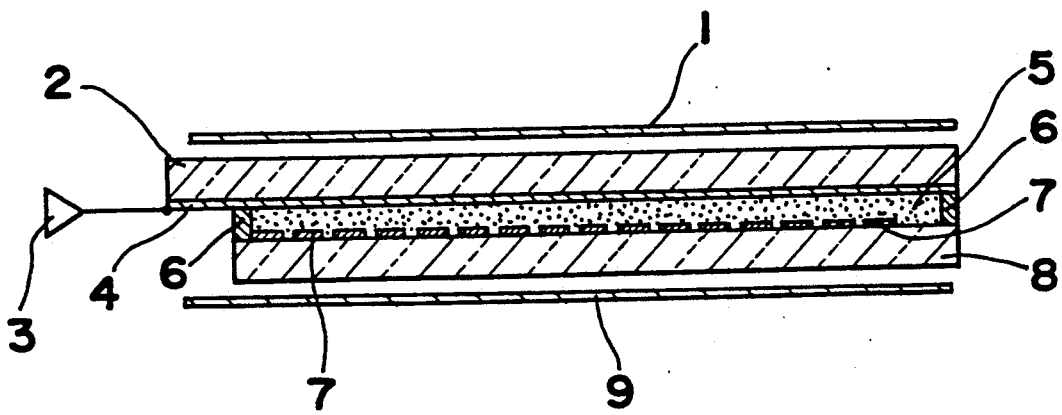
FIG. 8 is a schematic longitudinal cross-sectional view showing the liquid crystal display device shown in FIG. 7.

As shown in FIG. 4, sixteen transparent scanning electrodes 4a ($L_{1a}$ to $L_{16a}$) are formed on the inner surface of the substrate 13 so as to correspond to the scanning electrodes 4 of the matrix display panel 20, and on the opposed inner surface of the substrate 15, a transparent rectangular ground electrode 14 is formed so as to cover the whole area of the substrate 15.

These sixteen scanning electrodes 4a ($L_{1a}$ to $L_{16a}$) are divided into four groups, each being comprised of four successive four scanning electrodes $L_{1a}$ to $L_{4a}$, $L_{5a}$ to $L_{8a}$, $L_{9a}$ to $L_{12a}$, $L_{13a}$ to $L_{16a}$, respectively. Further each scanning electrode belonging to one group is connected to a driver 17 so as to be able to apply a voltage Vh commonly. Further, a ground driver 18 is connected to the ground electrode 14 in order to suppy zero voltage to the same.

Thus, the light shutter panel 21 can shade the light from the light source 19 in the unit of each group when the voltage Vh is applied thereto by the corresponding driver 17 ($D_1$, $D_2$, $D_3$ or $D_4$). In other words, the shutter panel 21 has four shutter elements in this example.

A frequency for driving the drivers $D_1$ to $D_4$ is chosen higher than that of the commercial electric power in order to avoid possible flickers. In the preferred embodiment, the light intensity of the light source 19 is kept constant as shown in FIG. 6.

A control circuit 30 applies predetermined voltages to the scanning electrodes 4 ($L_1$ to $L_{16}$), the signal electrodes 7 and the scanning electrodes 4a ($L_{1a}$ to $L_{16a}$) through the drivers 3, the drivers 10 and the drivers 17

($D_1$ to $D_4$), respectively, as will be described below in detail.

The operation of the matrix type liquid crystal display device of the preferred embodiment will be described below in detail.

Assuming that the matrix display panel 20 has M scanning electrodes 4 to be driven in a frame period $T_F$ and that M scanning electrodes 4 are divided into $2 \times N$ groups from the first to 2N-th, each of which is comprised of successive K scanning electrodes 4, wherein M, N and K are positive integers chosen so as to satisfy the following conditions:

$$N > 60 \text{ (Hz)} \times T_F \quad (4)$$

wherein 60 (Hz) is the frequency of the commercial electric power, and $$K \geq \frac{M}{2N} . \quad (5)$$

The first condition is given in order to avoid possible flickers. K is desirably chosen as a minimum integer among integers satisfying the condition (5).

The light shutter panel 21 has the same grouping structure as that of the matrix display panel 20 as far as the scanning electrodes 4a are concerned. Namely, it has $2 \times N$ light shutter elements being comprised of the first to 2N-th groups, each group having K successive scanning electrodes 4a.

As stated above, when either one of the first to 2N-th light shutter elements is driven by applying the voltage thereto, the light amount incident to the portion of the corresponding group of the scanning electrodes 4 of the matrix display device 20 decrease accordingly.

In this preferred embodiment, if either one of the scanning electrodes 4 belonging to an odd group of the matrix display panel 20 is driven to rewrite, all of the odd shutter elements of the light shutter panel 21 are driven to close. On the contrary, if either one of the scanning electrodes 4 belonging to an even group is driven to rewrite, all of the even shutter elements of the light shutter panel 21 are driven to close. Respective shutter elements are normally opened except for the case mentioned above Thus, the light amount incident to a picture element defined on an arbitrary scanning electrode 4 decreases for a time interval $T_F/2N$ and increases for the time interval of $T_F/2N$. Further, and this deecrease and increase pattern of the light amount is repeated. Namely, the period of the repeated pattern becomes $T_F/N$, and according to the condition (4), the following unequality is satisfied.

$$\frac{T_F}{N} < \frac{1}{60} \text{ (seconds)} \quad (6)$$

Thus, no flicker is caused in the preferred embodiment.

The operation of the light shutter panel 21 will be described below, referring to a timing chart shown in FIG. 6.

In order to make the light shutter element corresponding to the scanning electrodes $L_1$ to $L_4$ open, the control circuit 30 applies a voltage Vh satisfying the following equation (7) (or (8)) to the scanning electrodes $L_{1a}$ to $L_{4a}$ through the driver $D_1$ for the time interval $\tau_0$ seconds. On the other hand, in order to make the light shutter element corresponding to the scanning electrodes $L_1$ to $L_4$ close, the control circuit 30 applies a voltage Vh satisfying the following equation (8) (or (7)) to the scanning electrodes $L_{1a}$ to $L_{4a}$ through the driver $D_1$ for the time interval $\tau_0$ seconds.

$$Vh \geq Vth_1 \quad (7)$$

$$Vh \geq -Vth_2 \quad (8)$$

Namely, when the voltage $V_0$ (volts) is applied to the scanning electrodes $L_{1a}$ to $L_{4a}$ for the time interval $\tau_0$ seconds, after the voltage $-V_0$ (volts) is applied thereto for the time interval $\tau_0$ seconds, the light shutter element corresponding to the scanning electrodes $L_1$ to $L_4$ is opened. On the other hand, when the voltage $-V_0$ (volts) is applied to the scanning electrodes $L_{1a}$ to $L_{4a}$ for the time interval $\tau_0$ seconds after the voltage $V_0$ (volts) is applied thereto for the time interval $\tau_0$ seconds, the light shutter element corresponding to the scanning electrodes $L_1$ to $L_4$ is closed.

The experimental result of the liquid crystal display device of the preferred embodiment will be described below.

The drivers $D_1$ to $D_4$ are driven so that the light shutter elements are opened and closed as shown in (c) to (f) of FIG. 6, in synchronizing with that the rewritten electrodes 4 of the matrix display panel 20 are selected as shown in (b) of FIG. 6. Portions (c) to (f) of FIG. 3 show the driving voltages applied to the scanning electrodes $L_{1a}$ to $L_{4a}$, $L_{5a}$ to $L_{8a}$, $L_{9a}$ to $L_{12a}$, and $L_{13a}$ to $L_{16a}$ in the above case. Further (g) and (h) of FIG. 3 show the lightness of the picture elements defined on the scanning electrode $L_1$ when the picture elements are set in the bright and dark states, respectively, as in this case.

As is apparent from the above experiment, the brightness of the picture elements changes, mainly, according to the switching period of the light shutter.

Furthermore, a liquid crystal display device having the fundamental structure shown in FIGS. 1 and 2 and having the 400 scanning electrodes 4 was made. When the voltage Vc is applied to the 400 scanning electrodes 4 of the liquid crystal display device, images with no flicker can be obtained on the liquid crystal display device.

In the present preferred embodiment, the scanning electrodes 4 are selected sequentially in the order from the scanning electrode $L_1$ to $L_{16}$ as shown in (b) of FIG. 6. Further, there is no problem even though the light shutter element corresponding to the scanning electrode located far away from the selected scanning electrode 4, is opened.

In the present preferred embodiment, the ferroelectric liquid crystal panel 21 is used as the light shutter panel. However, a lighting apparatus having the same effect as that of the ferroelectric liquid crystal panel, such as an electroluminescent display, a vacuum fluorescent display, a plasma display panel, and a twisted nematic liquid crystal display, respectively comprising strip shaped picture elements arranged along the scanning electrodes 4 of the matrix display panel 20, can be used as the light shutter panel.

In the present preferred embodiment, as shown in FIG. 6, when the light shutter element corresponding to the scanning electrodes $L_1$ to $L_4$ are closed, the light shutter element corresponding to the scanning electrodes $L_5$ to $L_8$ are opened and the light shutter element corresponding to the scanning electrodes $L_9$ to $L_{12}$ are closed. Namely, the opened light shutter element and the closed light shutter element are alternately at intervals of the aforementioned scanning electrode group. In this case, the flicker can be preferably be suppressed. However, the present invention is not limited to this in that the light shutter elements corresponding to the scanning electrodes 4 of the picture elements being rewritten may be closed, and the other light shutter elements may be opened, resulting in the flicker being suppressed sufficiently.

In the present preferred embodiment, the scanning electrodes 4 correspond to one light shutter element in the unit of the electrode group. This is because it is difficult to make the scanning electrodes 4 correspond to the light shutter elements one by one precisely when the matrix display panel 20 is overlapped on the light shutter panel 21. When the panels 20 and 21 are overlapped with a high precision so that the scanning electrodes 4 correspond to the light shutter elements one by one, respectively, the opening and closing operation of every one light shutter element corresponding to the selected one electrode 4 may be controlled.

As shown in FIG. 6, the opening time interval OP of the light shutter elements is smaller than a predetermined time interval. For example, when the light is projected to the scanning electrodes $L_5$ to $L_8$, the light shutter element corresponding to the scanning electrodes $L_5$ and $L_8$ is closed and the light shutter element corresponding to the scanning electrodes $L_6$ and $L_7$ is opened. This is because it is taken into consideration that the light transmitting through the opened light shutter element spreads out when there is a gap between the matrix display panel 20 and the light shutter panel 21. Therefore, in the case that the liquid crystal display device contains a structure wherein the light transmitting through the opened light shutter element does not spread out, the opening time interval OP may not be smaller than the predetermined time interval.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A liquid crystal display device comprising:
   first and second transparent substrates in parallel to each other;
   a plurality of transparent scanning electrodes formed on the inner surface of said first transparent substrate
   a plurality of transparent signal electrodes formed on the inner surface of said second transparent substrate, so as to cross said transparent scanning electrodes;
   a liquid crystal layer for displaying picture elements defined at the crossings between said transparent scanning electrodes and said transaprent signal electrodes in accordance with voltages applied thereto during a write frame and during a rewrite frame, said liquid crystal layer being arranged between said first transaprent substrate and said second transparent substrate;
   a light source for emitting a light toward said liquid crystal layer; and
   achromatic light shutter means arranged between said liquid crystal layer and said light source, said achromatic light shutter means including a plurality of individual single light shutter components divided into a plurality of first and second groups, each component of said first and second groups corresponding to one of said plurality of scanning electrodes so that when the scanning electrodes corresponding to one of said first groups are rewritten during said rewrite frame, all of said first groups shade light emitted from said light source incident to corresponding picture elements and all of said second groups simultaneously pass light emitted from said light source to corresponding picture elements.

2. A liquid crystal display device as claimed in claim 1, wherein said transparent scanning electrodes are orthogonal to said transparent signal electrodes, and the picture elements of said liquid crystal layer are formed in a matrix shape.

3. A liquid crystal display device as claimed in claim 1, wherein said light shutter means comprises:
   third and fourth transparent substrates arranged in parallel to each other;
   a plurality of further transparent scanning electrodes formed on the inner surface of said third transparent substrate so as to parallel said transparent scanning electrodes;
   a ground electrode formed on the inner surface of said fourth transparent substrate so as to face said further transparent scanning electrodes; and
   a further liquid crystal layer for forming light shutter elements defined on said further transparent scanning electrodes in accordance with a voltage applied thereto, said further liquid crystal layer being arranged between said third transparent substrate and said fourth transparent substrate.

4. A liquid crystal display apparatus comprising:
   a plurality of parallel scanning electrodes, arranged in a plurality of groups, formed on a first substrate;
   a plurality of parallel signal electrodes formed on a second substrate, said signal electrodes being orthogonal to said scanning electrodes so as to cross said scanning electrodes;
   a liquid crystal layer sandwiched between said first and second substrates for displaying picture elements defined at the crossings of said signal electrodes and scanning electrodes in accordance with voltages applied thereto during a write frame and during a rewrite frame;
   a ligh source for emitting light toward said liquid crystal layer; and
   achromatic light shutter means arranged between said light source and said liquid crystal layer arranged in a plurality of first and second groups groups corresponding to said plurality of scanning electrodes so that when the scanning electrodes corresponding to one of said first groups are rewritten during said rewrite frame, all of said first groups shade light emitted from said light source incident to corresponding picture elements and all of said second groups simultaneously pass light emitted from said light source to corresponding picture elements.

5. An apparatus, as claimed in claim 4, further comprising:
   driving means, connected to said plurality of scanning electrodes, for supplying voltage during said write frame and supplying voltage during said rewrite frames.

6. An apparatus, as claimed in claim 5, wherein said driving means is further connected to said light shutter means for simultaneously driving said light shutter means to pass light emitted from the light source to picture elements corresponding to scanning electrodes corresponding to said second groups.

7. An apparatus, as claimed in claim 6, further comprising selecting means, connected to said drive means, for sequentially selecting certain of said scanning electrode groups to be driven during said write frame and subsequently during said rewrite frame and for selecting said other groups to be driven during said rewrite frame and said write frame.

8. An apparatus, as claimed in claim 4, wherein said light shutter means comprises:
   a plurality of shutter elements in each of said plurality of said first grups, arranged so as to correspond to each of said plurality of scanning electrodes, each for passing light emitted from said light source when a corresponding scanning electrode is not being rewritten and for shading light emitted from said light source when a corresponding scanning electrode is being rewritten.

9. An apparatus, as claimed in claim 6, wherein said light shutter means comprises:
   a plurality of shutter elements in each of said plurality of said second groups, arranged so as to correspond to each of said plurality of scanning electrodes, each being driven to pass light emitted from said light source when a corresponding scanning electrode is not being rewritten during said rewrite frame and each being driven to shade light emitted from said light source when a corresponding scanning electrode is being rewritten during a rewrite frame.

10. An apparatus, as claimed in claim 4, wherein said light shutter means comprises:
    a first substrate;
    a second substrate; and
    a liquid crystal layer sandwiched between said first and second substrate.

11. An apparatus, as claimed in claim 8, wherein said light shutter means further comprises:
    a first substrate containing said pluraity of shutter elements;
    a second substrate; and
    a liquid crystal layer sandwiched between said first and second substrate;

12. An apparatus, as claimed in claim 4, wherein said plurality of scanning and signal electrodes are transparent electrodes.

13. An apparatus, as claimed in claim 8, wherein said plurality of scanning and signal electrodes, and said plurality of shutter elements are transparent electrodes.

* * * * *